US009888509B2

(12) United States Patent
Pan et al.

(10) Patent No.: US 9,888,509 B2
(45) Date of Patent: Feb. 6, 2018

(54) METHOD AND APPARATUS FOR PERFORMING A RANDOM ACCESS (RA) PROCEDURE FOR DEVICE TO-DEVICE (D2D) SERVICE IN A WIRELESS COMMUNICATION SYSTEM

(71) Applicant: INNOVATIVE SONIC CORPORATION, Taipei (TW)

(72) Inventors: Li-Te Pan, Taipei (TW); Wei-Yu Chen, Taipei (TW); Li-Chih Tseng, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 63 days.

(21) Appl. No.: 14/801,270

(22) Filed: Jul. 16, 2015

(65) Prior Publication Data

US 2016/0021694 A1    Jan. 21, 2016

Related U.S. Application Data

(60) Provisional application No. 62/025,189, filed on Jul. 16, 2014.

(51) Int. Cl.
*H04L 29/08* (2006.01)
*H04W 76/02* (2009.01)
(Continued)

(52) U.S. Cl.
CPC ......... *H04W 76/023* (2013.01); *H04L 5/0091* (2013.01); *H04L 29/08306* (2013.01);
(Continued)

(58) Field of Classification Search
CPC . H04L 29/08306; H04L 67/104; H04W 4/005
See application file for complete search history.

(56) References Cited

U.S. PATENT DOCUMENTS

| 2015/0004901 A1* | 1/2015 | Agiwal | H04W 76/023 455/39 |
| 2015/0334756 A1* | 11/2015 | Lu | H04W 76/023 370/329 |

OTHER PUBLICATIONS

R2-140625, "Resource allocation for D2D transmitter in coverage", Feb. 10-14, 2014.*

(Continued)

*Primary Examiner* — Salvador E Rivas
(74) *Attorney, Agent, or Firm* — Blue Capital Law Firm, P.C.

(57) ABSTRACT

A method and apparatus are disclosed for performing a RA procedure for at least a first D2D communication session and a second D2D communication session in a wireless communication system. The method includes a UE transmitting a first message to a network, wherein the first message is a preamble. The method also includes the UE receiving a second message from the network after transmission of the first message, wherein the second message contains a first UL resource. The method further includes the UE using the first UL resource to transmit a third message to the network after reception of the second message, wherein the third message includes at least a BSR MAC CE. In addition, the method includes the UE determining that the RA procedure is successful if the UE receives a fourth message, wherein the fourth message contains either a second UL resource or at least a D2D resource depending on whether or not the BSR MAC CE is associated with the first D2D communication session and the second D2D communication session.

6 Claims, 8 Drawing Sheets

(51) Int. Cl.
  *H04W 4/00*     (2009.01)
  *H04W 74/08*    (2009.01)
  *H04L 5/00*     (2006.01)
  *H04W 72/04*    (2009.01)
  *H04W 74/00*    (2009.01)
  *H04W 88/02*    (2009.01)
  *H04W 88/08*    (2009.01)

(52) U.S. Cl.
  CPC ........... *H04L 67/104* (2013.01); *H04W 4/005* (2013.01); *H04W 72/0413* (2013.01); *H04W 74/002* (2013.01); *H04W 74/0833* (2013.01); *H04W 88/02* (2013.01); *H04W 88/08* (2013.01)

(56) References Cited

OTHER PUBLICATIONS

R1-142112, "Mode 1 resource allocation for D2D broadcast communication", May 19-23, 2014.*
R2-141256, "Layer 2 procedures for D2D communication", Mar. 31-Apr. 4, 2014.*
3GPP TSG RAN WG1 Meeting#77, Seoul, Korea, May 19-23, 2014 (R1-142112).
3GPP TSG RAN WG2#85, Prague, Czech Republic, Feb. 10-14, 2014 (R2-140625).
3GPP TSG RAN WG3 Meeting#81, Barcelona, Spain, Aug. 19-23, 2013 (R3-131457).
Search Report on corresponding EP Patent Application No. 15177073,2 dated Oct. 29, 2015.

* cited by examiner

METHOD AND APPARATUS FOR PERFORMING A RANDOM ACCESS (RA) PROCEDURE FOR DEVICE TO-DEVICE (D2D) SERVICE IN A WIRELESS COMMUNICATION SYSTEM

CROSS-REFERENCE TO RELATED APPLICATIONS

The present application claims the benefit of U.S. Provisional Patent Application Ser. No. 62/025,189 filed on Jul. 16, 2014, the entire disclosure of which is incorporated herein by reference.

FIELD

This disclosure generally relates to wireless communication networks, and more particularly, to a method and apparatus for performing a RA procedure for D2D service in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for performing a RA procedure for at least a first D2D communication session and a second D2D communication session in a wireless communication system. The method includes a UE transmitting a first message to a network, wherein the first message is a preamble. The method also includes the UE receiving a second message from a network after transmission of the first message, wherein the second message contains a first UL (Uplink) resource. The method further includes the UE using the first UL resource to transmit a third message to the network after reception of the second message, wherein the third message includes at least a buffer status report (BSR) medium access control (MAC) control element (CE). In addition, the method includes the UE determining that a contention resolution of the RA procedure is successful if the UE receives a fourth message, wherein the fourth message contains either a second UL resource or at least a D2D resource depending on whether or not the BSR MAC CE is associated with the first D2D communication session and the second D2D communication session.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including the RAN1#77 Chairman's Notes; the RAN2#85 Chairman's Notes; SP-110638, "WID on Proposal for a study on Proximity-based Services"; R2-142229, "D2D BSR Triggering and Sending Mechanism", Huawei and HiSilicon; and TS 36.321 V11.2.0, "Medium Access Control (MAC) protocol specification". The standards and documents listed above are hereby expressly incorporated by reference in their entirety.

Figure 1:
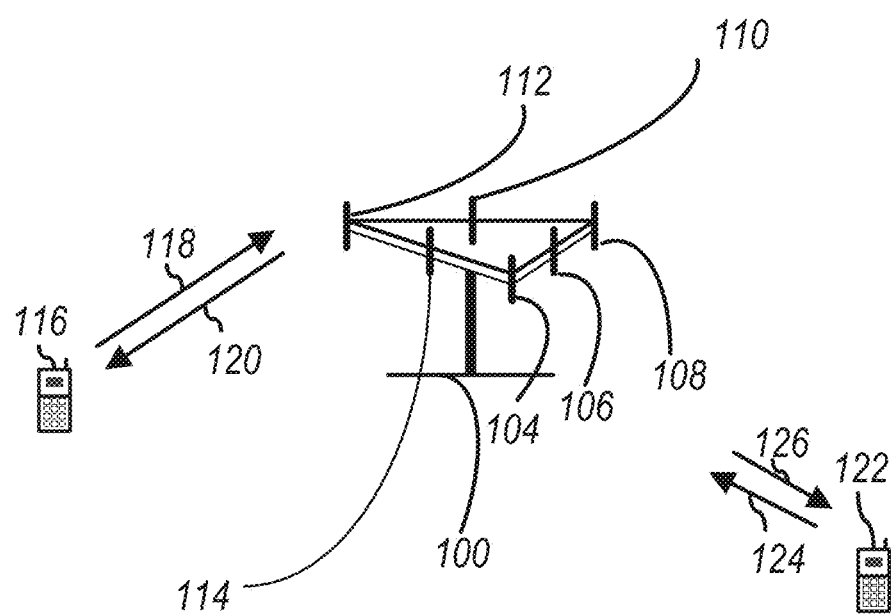
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
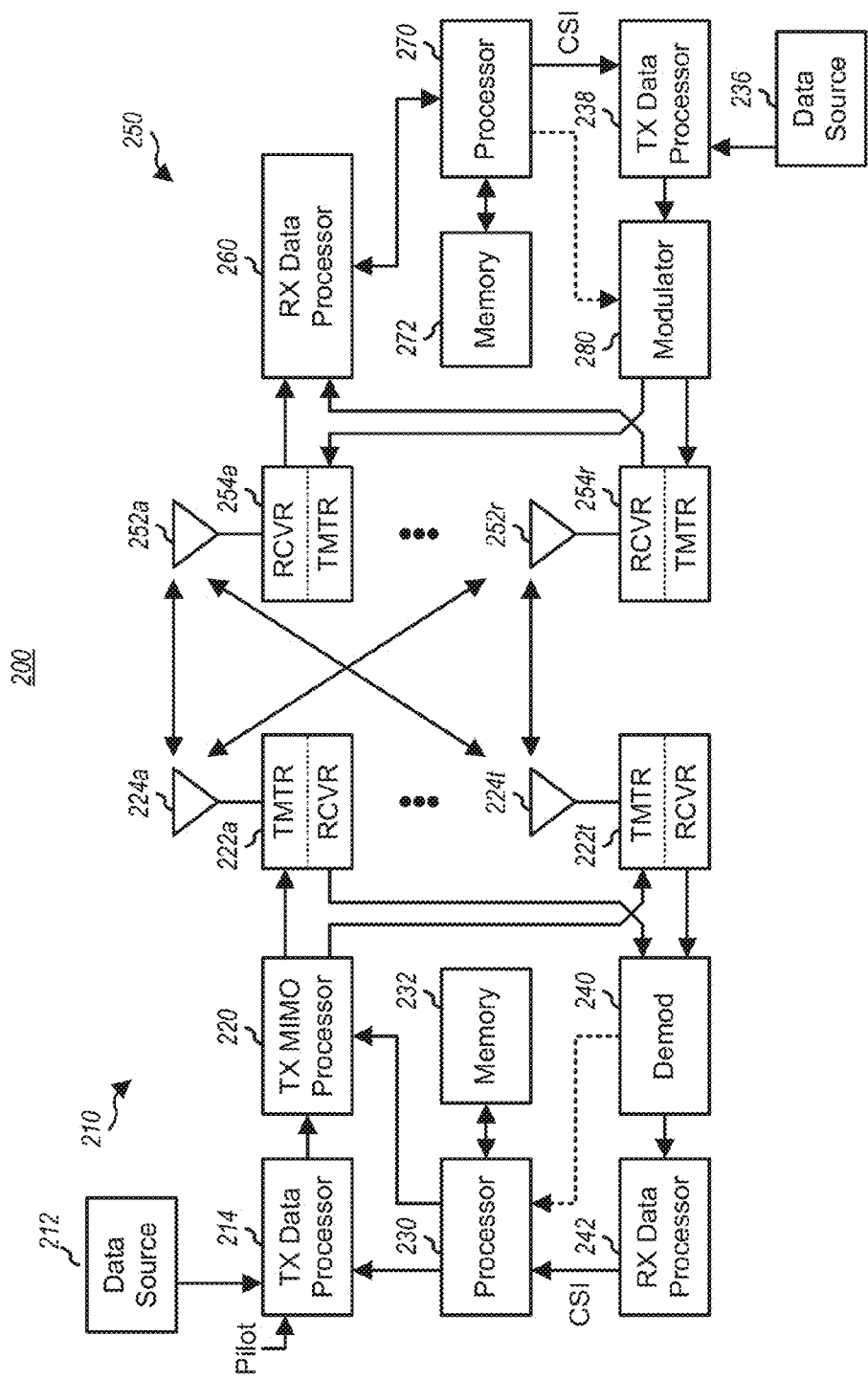
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
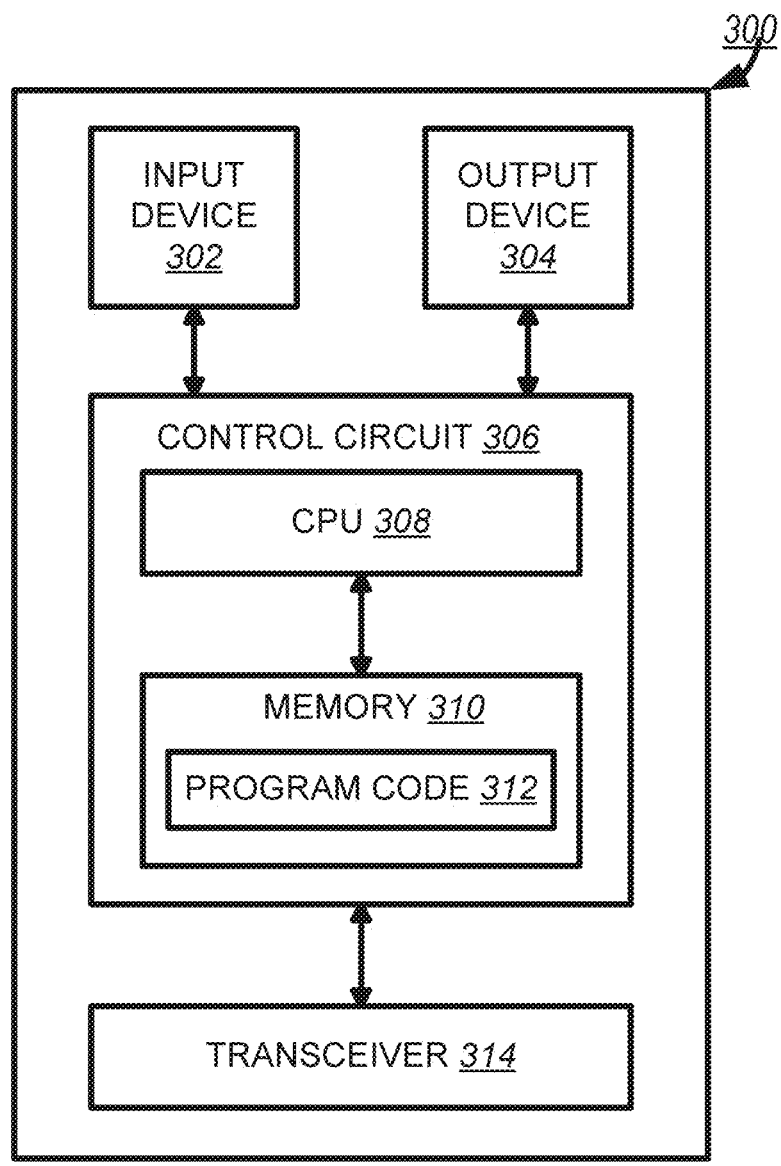
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
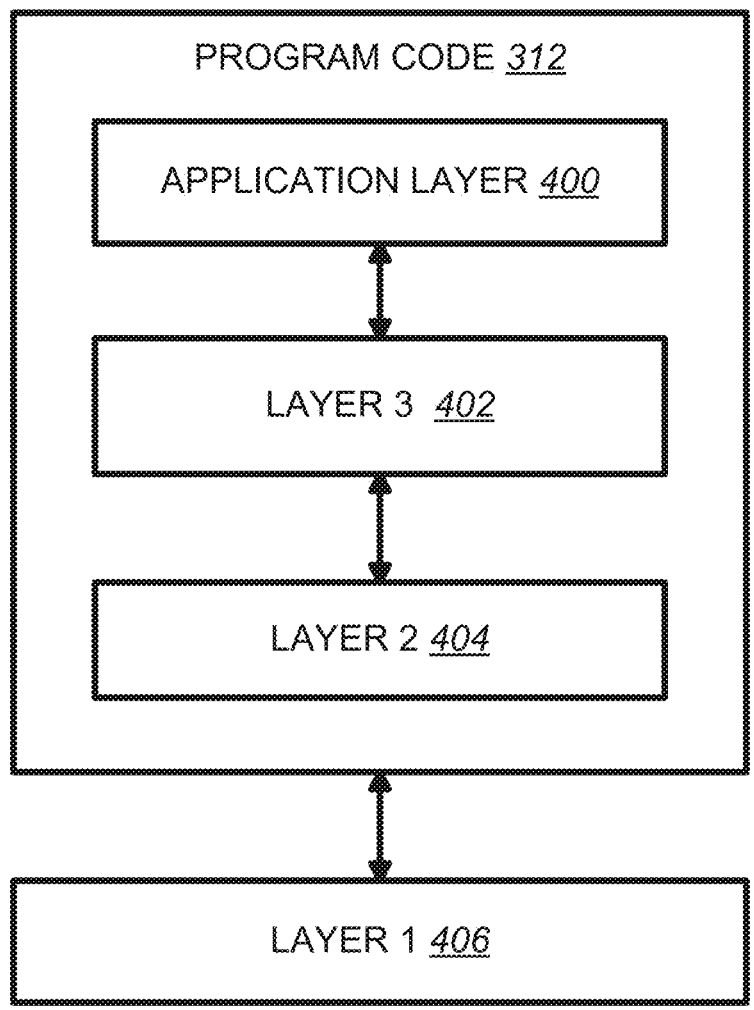
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP SP-110638 proposes a new study item on proximity-based services (ProSe), or D2D services. 3GPP SP-110638 describes the justification and objective of the study item as follows:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:

1. Commercial/social use
2. Network offloading
3. Public Safety
4. Integration of current infrastructure services, to assure the consistency of the user experience including reach-ability and mobility aspects Additionally, the study item will study use cases and identify potential requirements for 5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

As discussed in 3GPP RAN2#85 Chairman's Notes, it was agreed in the RAN2#85 meeting that UE can request D2D resource from network via RA procedure as follows:

2 In Mode 1, a UE requests transmission resources from an eNB. The eNB schedules transmission resources for transmission of scheduling assignment(s) and data.

2a In Mode 1, the UE sends a scheduling request (D-SR or RA) to the eNB followed by a BSR based on which the eNB can determine that the UE intends to perform a D2D transmission as well as the required amount resources.

As discussed in the 3GPP RAN1#77 Chairman's Notes, RAN1#77 meeting assumed that a D2D RNTI (Radio Network Temporary Identifier) is used to distinguish a grant for UL (Uplink) or D2D as follows:

Working Assumption:
For Mode 1, DCI format which is same size as existing DCI format 0 is used for allocating D2D Data and SA Same grant for D2D Data and SA
For Mode 1, a D2D RNTI is used to distinguish a grant for WAN from grant from D2D 3GPP R2-142229 proposed that UE shall consider the RACH (Random Access Channel) successful if it receives a D2D grant after sending a D2D BSR (Buffer Status Report) in Msg3 as follows:

If there is no dedicated PUCCH resource available for SR, RACH should be used to send D2D BSR as shown in FIG. 1. In this case, the D2D BSR shall be transmitted in MSG3. Upon reception of the D2D BSR in MSG3, the eNB may schedule D2D resources for the UE. Thus, the UE can consider the RACH successful if it receives a D2D grant.

Proposal 5: The UE shall consider the RACH successful if it receives a D2D grant contained in a PDCCH transmission after sending a D2D BSR in MSG3.

Figure 5:
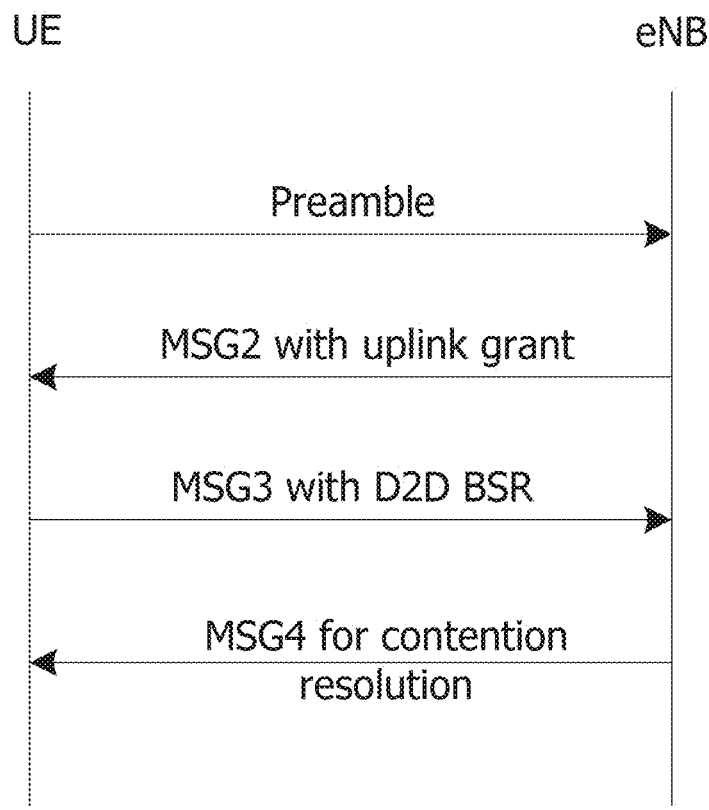
FIG. 5 is a reproduction of FIG. 1 of 3GPP R2-142229.
Figure 6:
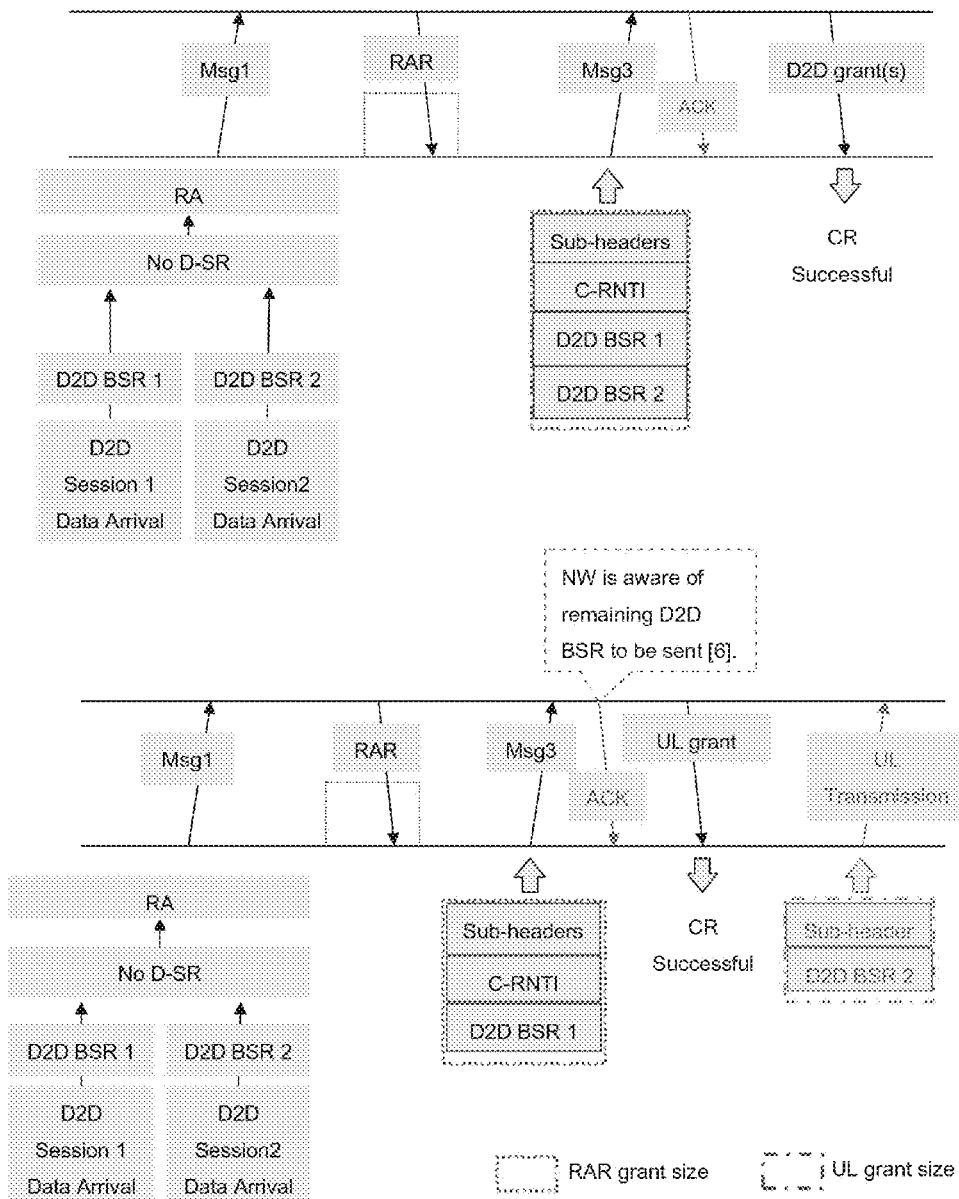
FIG. 6 illustrates a RA procedure in accordance with one exemplary embodiment.

[FIG. 1 of 3GPP R2-142229 has been reproduced as FIG. 5]

3GPP TS 36.321 V11.2.0 introduced the Random Access procedure as follows:

5 MAC Procedures 5.1 Random Access Procedure

[ . . . ]

5.1.3 Random Access Preamble Transmission

The random-access procedure shall be performed as follows:
  set PREAMBLE_RECEIVED_TARGET_POWER to preambleInitialReceivedTargetPower+DELTA_PRE-AMBLE+(PREAMBLE_ COUNTER−1)*power-RampingStep;
  instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap, the UE shall monitor the PDCCH of the PCell for Random Access Response(s) identified by the RA-RNTI defined below, in the RA Response window which starts at the subframe that contains the end of the preamble transmission [7] plus three subframes and has length ra-ResponseWindowSize subframes. The RA-RNTI associated with the PRACH in which the Random Access Preamble is transmitted, is computed as:

$$RA\text{-}RNTI = 1 + t\_id + 10 * f\_id$$

Where t_id is the index of the first subframe of the specified PRACH (0≤t_id<10), and f_id is the index of the specified PRACH within that subframe, in ascending order of frequency domain (0≤f_id<6). The UE may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the UE shall regardless of the possible occurrence of a measurement gap:
  if the Random Access Response contains a Backoff Indicator subheader:
    set the backoff parameter value in the UE as indicated by the BI field of the Backoff Indicator subheader and Table 7.2-1.
  else, set the backoff parameter value in the UE to 0 ms.
  if the Random Access Response contains a Random Access Preamble identifier corresponding to the transmitted Random Access Preamble (see subclause 5.1.3), the UE shall:
    consider this Random Access Response reception successful and apply the following actions for the serving cell where the Random Access Preamble was transmitted:
      process the received Timing Advance Command (see subclause 5.2);
      indicate the preambleInitialReceivedTargetPower and the amount of power ramping applied to the latest preamble transmission to lower layers (i.e., (PREAMBLE_TRANSMISSION_ COUNTER−1)*powerRampingStep);
      process the received UL grant value and indicate it to the lower layers;

if ra-PreambleIndex was explicitly signalled and it was not 000000 (i.e., not selected by MAC):
  consider the Random Access procedure successfully completed.
else, if the Random Access Preamble was selected by UE MAC:
  set the Temporary C-RNTI to the value received in the Random Access Response message no later than at the time of the first transmission corresponding to the UL grant provided in the Random Access Response message;
  if this is the first successfully received Random Access Response within this Random Access procedure:
    if the transmission is not being made for the CCCH logical channel, indicate to the Multiplexing and assembly entity to include a C-RNTI MAC control element in the subsequent uplink transmission;
    obtain the MAC PDU to transmit from the "Multiplexing and assembly" entity and store it in the Msg3 buffer.

NOTE: When an uplink transmission is required, e.g., for contention resolution, the eNB should not provide a grant smaller than 56 bits in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the UE shall:
  increment PREAMBLE_TRANSMISSION_COUNTER by 1;
  If PREAMBLE_TRANSMISSION_COUNTER= preambleTransMax+1:
    if the Random Access Preamble is transmitted on the PCell:
      indicate a Random Access problem to upper layers;
    if the Random Access Preamble is transmitted on an SCell:
      consider the Random Access procedure unsuccessfully completed.
  if in this Random Access procedure, the Random Access Preamble was selected by MAC:
    based on the backoff parameter in the UE, select a random backoff time according to a uniform distribution between 0 and the Backoff Parameter Value;
    delay the subsequent Random Access transmission by the backoff time;
  proceed to the selection of a Random Access Resource (see subclause 5.1.2).

5.1.5 Contention Resolution

Contention Resolution is based on either C-RNTI on PDCCH of the PCell or UE Contention Resolution Identity on DL-SCH.

Once Msg3 is transmitted, the UE shall:
  start mac-ContentionResolutionTimer and restart mac-ContentionResolutionTimer at each HARQ retransmission;
  regardless of the possible occurrence of a measurement gap, monitor the PDCCH until mac-ContentionResolutionTimer expires or is stopped;
  if notification of a reception of a PDCCH transmission is received from lower layers, the UE shall:
    if the C-RNTI MAC control element was included in Msg3:
      if the Random Access procedure was initiated by the MAC sublayer itself and the PDCCH transmission is addressed to the C-RNTI and contains an UL grant for a new transmission; or
      if the Random Access procedure was initiated by a PDCCH order and the PDCCH transmission is addressed to the C-RNTI:
        consider this Contention Resolution successful;
        stop mac-ContentionResolutionTimer;
        discard the Temporary C-RNTI;
        consider this Random Access procedure successfully completed.
    else if the CCCH SDU was included in Msg3 and the PDCCH transmission is addressed to its Temporary C-RNTI:
      if the MAC PDU is successfully decoded:
        stop mac-ContentionResolutionTimer;
        if the MAC PDU contains a UE Contention Resolution Identity MAC control element; and
        if the UE Contention Resolution Identity included in the MAC control element matches the CCCH SDU transmitted in Msg3:
          consider this Contention Resolution successful and finish the disassembly and demultiplexing of the MAC PDU;
          set the C-RNTI to the value of the Temporary C-RNTI;
          discard the Temporary C-RNTI;
          consider this Random Access procedure successfully completed.
        else
          discard the Temporary C-RNTI;
          consider this Contention Resolution not successful and discard the successfully decoded MAC PDU.
  if mac-ContentionResolutionTimer expires:
    discard the Temporary C-RNTI;
    consider the Contention Resolution not successful.
  if the Contention Resolution is considered not successful the UE shall:
    flush the HARQ buffer used for transmission of the MAC PDU in the Msg3 buffer;
    increment PREAMBLE_TRANSMISSION_COUNTER by 1;
    If PREAMBLE_TRANSMISSION_COUNTER= preambleTransMax+1:
      indicate a Random Access problem to upper layers.
    based on the backoff parameter in the UE, select a random backoff time according to a uniform distribution between 0 and the Backoff Parameter Value;
    delay the subsequent Random Access transmission by the backoff time;
    proceed to the selection of a Random Access Resource (see subclause 5.1.2).

In the legacy LTE, if a UE has new data for UL transmission while there is no PUCCH (Physical Uplink Control Channel) resource for SR (Scheduling Request) available, the UE shall initiate a RA procedure and transmits Msg3 with LTE BSR to the network. After that, the UE would consider the RA procedure successful if the UE receives a UL grant for new transmission in Msg4.

For D2D communication, a UE may host multiple D2D sessions. Those multiple D2D sessions may trigger multiple D2D BSRs, which would make the UE performs a RA procedure for requesting D2D grant(s) from the network. Since the network will not distinguish the intention of the UE after receiving preamble, the network would not schedule sufficient random access response (RAR) grant(s) for the UE. Thus, it is quite possible that the UE would not be able to accommodate all of multiple D2D BSRs in Msg3 with the received RAR grant(s). After the reception of Msg3 with partial D2D BSR(s), if the network could understand that UE has remaining D2D BSR(s) to be transmitted (as discussed in U.S. Provisional Application Ser. No. 61/991,082), it is quite reasonable that the network would schedule UL grant(s) for the UE to transmit the remaining D2D BSR(s) for scheduling purposes. Besides, the network would also schedule D2D grant(s) for the D2D BSR(s) reported successful. Therefore, it would be possible for UE to receive UL grant(s) or D2D grant(s) in a RA procedure which is performed for requesting D2D grant(s).

3GPP R2-142229 proposed that UE shall determine a RA procedure performed for requesting D2D grant successful if it receives a PDCCH transmission for a D2D grant after sending an Msg3 with D2D BSR. This new mechanism of RA procedure may generally be fine for the case of UE accommodating one D2D BSR in Msg3. However, the mechanism should be further modified if the above concern is taken into account.

Figure 7:
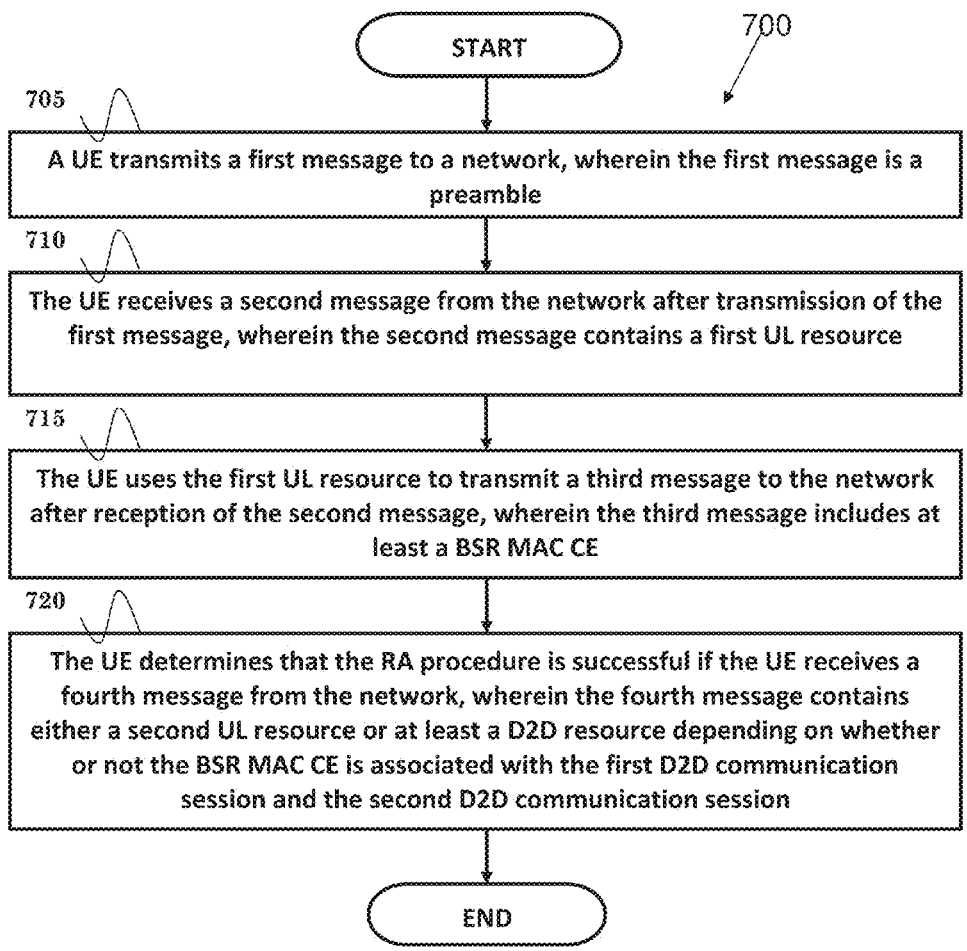
FIG. 7 is a flow chart according to one exemplary embodiment.

FIG. 7 is a flow chart 700 in accordance with one exemplary embodiment from the perspective of a UE. In general, FIG. 7 illustrates a method of the UE performing a RA procedure for at least a first D2D communication session and a second D2D communication session. In step 705, the UE transmits a first message to a network, wherein the first message is a preamble, especially could be a random access preamble.

In step 710, the UE receives a second message from the network after transmission of the first message, wherein the second message contains a first uplink (UL) resource. In one embodiment, the first UL resource could be a UL grant. The first UL resource also could be a RA response grant.

In step 715, the UE uses the first UL resource to transmit a third message to the network after reception of the second message, wherein the third message includes at least a buffer status report (BSR) medium access control (MAC) control element (CE). In one embodiment, the third message could be an Msg3. Furthermore, the BSR MAC CE could be a D2D BSR MAC CE.

In step 720, the UE determines that the RA procedure is successful if the UE receives a fourth message from the network, wherein the fourth message contains either a second UL resource or at least a D2D resource depending on whether or not the BSR MAC CE is associated with the first D2D communication session and the second D2D communication session. The second UL resource could be a UL grant.

In one embodiment, the UE determines that the RA procedure is successful when the UE receives the second UL resource if the BSR MAC CE is not associated with the first D2D communication session and the second D2D communication session. More specifically, if the first UL resource is insufficient, the BSR MAC CE may be only associated with the first D2D communication session or with the second D2D communication session. The BSR MAC CE could be a truncated BSR MAC CE. Moreover, the truncated BSR MAC CE could be a truncated D2D BSR MAC CE.

Alternatively, the UE determines that the RA procedure is successful when the UE receives the D2D resource if the BSR MAC CE is associated with both the first D2D communication session and the second D2D communication session simultaneously in the third message. The D2D resource could be a D2D grant. The BSR MAC CE may not be a truncated BSR MAC CE.

In one embodiment, the fourth message could include the D2D resource. Furthermore, the fourth message could be a PDCCH transmission addressed to a first identification. More specifically, the first identification could be a D2D-RNTI (Device-to-Device Radio Network Temporary Identifier).

In another embodiment, the fourth message could include the second UL resource. Furthermore, the fourth message could be a PDCCH transmission addressed to a second identification. More specifically, the second identification could be a C-RNTI (Cell Radio Network Temporary Identifier).

Referring back to FIGS. 3 and 4, the device 300 includes a program code 312 stored in memory 310 of a UE. The CPU 308 could execute program code 312 to enable the UE to (i) transmit a first message to a network, wherein the first message is a preamble; (ii) receive a second message from the network after transmission of the first message, wherein the second message contains a first uplink (UL) resource; (iii) use the first UL resource to transmit a third message to the network after reception of the second message, wherein the third message includes at least a buffer status report (BSR) medium access control (MAC) control element (CE); and (iv) determine that RA procedure is successful when receiving a fourth message from the network, wherein the fourth message contains either a second UL resource or at least a D2D resource depending on whether or not the BSR MAC CE is associated with at least the first D2D communication session and the second D2D communication session.

Figure 8:
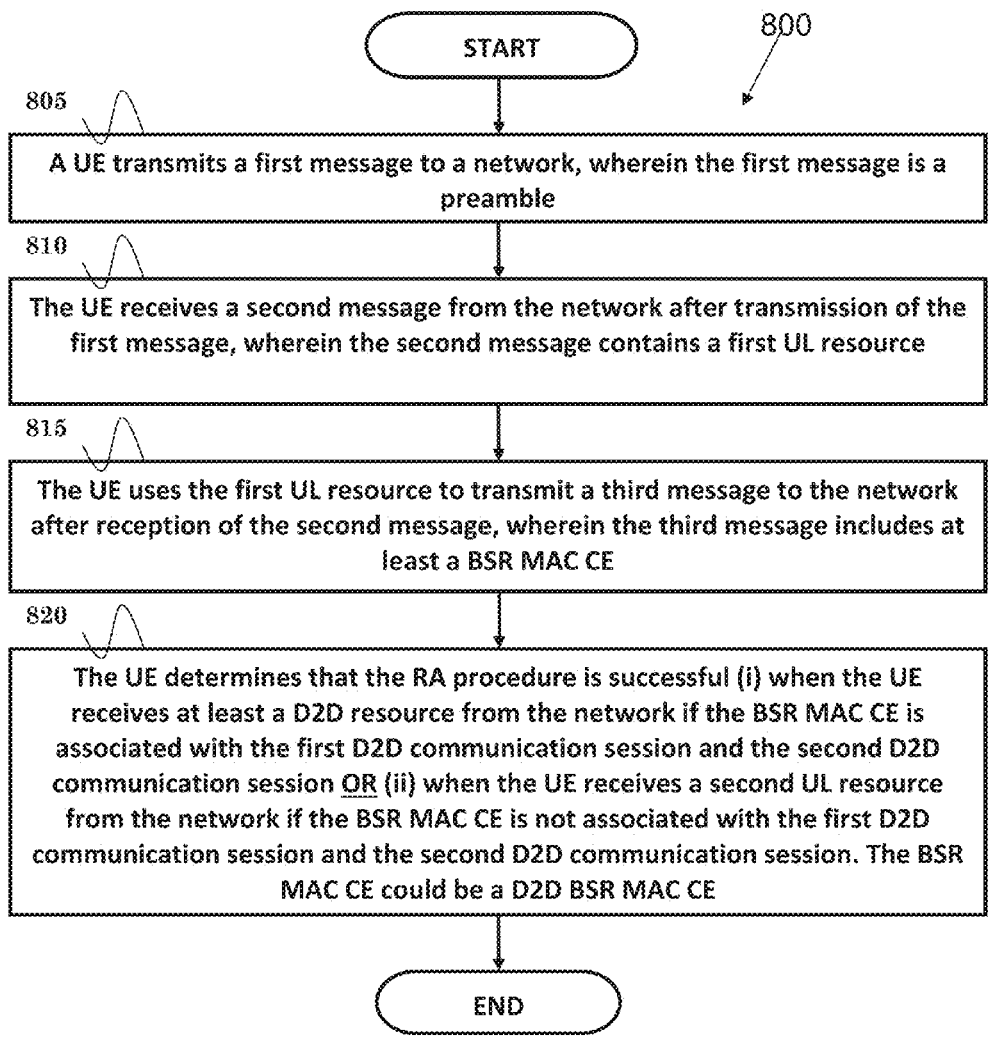
FIG. 8 is a flow chart according to one exemplary embodiment.

FIG. 8 is a flow chart 800 in accordance with one exemplary embodiment from the perspective of a UE. In general, FIG. 8 illustrates a method of the UE performing a RA procedure for at least a first D2D communication session and a second D2D communication session. In step 805, a UE transmits a first message to a network, wherein the first message is a preamble, especially could be a random access preamble.

In step 810, the UE receives a second message from the network after transmission of the first message, wherein the second message contains a first UL resource. In one embodiment, the first UL resource could be a UL grant. The first UL resource also could be a RA response grant.

In step 815, the UE uses the first UL resource to transmit a third message to the network after reception of the second message, wherein the third message includes at least a BSR MAC CE. In one embodiment, the third message could be an Msg3. Furthermore, the BSR MAC CE could be a D2D BSR MAC CE.

In step 820, the UE determines that the RA procedure is successful (i) when the UE receives at least a D2D resource from the network if the BSR MAC CE is associated with the first D2D communication session and the second D2D communication session OR (ii) when the UE receives a second UL resource from the network if the BSR MAC CE is not associated with the first D2D communication session and the second D2D communication session. The BSR MAC CE could be a D2D BSR MAC CE.

In one embodiment, the method further comprises that the UE receives a fourth message from the network after transmission of the third message, wherein the fourth message is a PDCCH (Physical Downlink Control Channel) transmission addressed to a first identification, and the fourth message contains at least a D2D resource. The first identification could be a D2D-RNTI (Device-to-Device Radio Network Temporary Identifier).

In the other embodiment, the method further comprises that the UE receives a fourth message from the network after transmission of the third message, wherein the fourth message is a PDCCH transmission addressed to a second identification, and the fourth message contains the second UL resource. The second identification is a C-RNTI (Cell Radio Network Temporary Identifier).

Referring back to FIGS. 3 and 4, the device 300 includes a program code 312 stored in memory 310 of a UE. In one embodiment, the CPU 308 could execute program code 312 to enable the UE to (i) transmit a first message to a network, wherein the first message is a preamble; (ii) receive a second message from the network after transmission of the first message, wherein the second message contains a first uplink (UL) resource; (iii) use the first UL resource to transmit a third message to the network after reception of the second message, wherein the third message includes at least a buffer status report (BSR) medium access control (MAC) control element (CE); and (iv) determine that the RA procedure is successful when the UE receives at least a D2D resource from the network if the BSR MAC CE is associated with at least the first D2D communication session and the second D2D communication session and that the RA procedure is successful when the UE receives a second UL resource from the network if the BSR MAC CE is not associated with the first D2D communication session and the second D2D communication session.

Referring back to FIGS. 3 and 4, the device 300 includes a program code 312 stored in memory 310 of a UE. In one embodiment, the CPU 308 could execute program code 312 to enable the UE (i) to receive a second message from a network, wherein the second message contains a first UL resource, and (ii) to determine that a RA procedure is successful if the UE receives at least a D2D resource from the network in case the first UL resource accommodates at least a BSR MAC CE which is associated with at least the first D2D communication session and the second D2D communication session in a third message. In one embodiment, the CPU could further execute program code 312 to enable the UE to determines that the RA procedure is successful if the UE receives a second UL resource from the network in case the first UL resource accommodates at least the BSR MAC CE which cannot be associated with both the first D2D communication session and the second D2D communication session simultaneously in the third message.

In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a user equipment (UE) performing a random access (RA) procedure for at least a first device-to-device (D2D) communication session and a second D2D communication session, comprising:
   the UE transmits a first message to a network in the RA procedure, wherein the first message is a preamble;
   the UE receives a second message from the network after transmission of the first message in the RA procedure, wherein the second message contains a first uplink (UL) resource;
   the UE uses the first UL resource to transmit a third message to the network after reception of the second message in the RA procedure, wherein the third message includes at least a D2D buffer status report (BSR) medium access control (MAC) control element (CE); and
   the UE determines that the RA procedure is successful when the UE receives a second UL resource if the D2D BSR MAC CE is not associated with the first D2D communication session and the second D2D communication session, or when the UE receives a D2D resource if the D2D BSR MAC CE is associated with the first D2D communication session and the second D2D communication session.

2. The method of claim 1, wherein the D2D BSR MAC CE is a truncated D2D BSR MAC CE if the D2D BSR MAC CE is not associated with the first D2D communication session and the second D2D communication session.

3. The method of claim 1, wherein the D2D BSR MAC CE is not a truncated D2D BSR MAC CE if the D2D BSR MAC CE is associated with both the first D2D communication session and the second D2D communication session.

4. A user equipment (UE) for performing a random access (RA) procedure for at least a first device-to-device (D2D) communication session and a second D2D communication session, comprising:
   a control circuit;
   a processor installed in the control circuit; and
   a memory installed in the control circuit and operatively coupled to the processor;
   wherein the processor is configured to execute a program code stored in the memory to:
      transmit a first message to a network in the RA procedure, wherein the first message is a preamble;
      receive a second message from the network after transmission of the first message in the RA procedure, wherein the second message contains a first uplink (UL) resource;
      use the first UL resource to transmit a third message to the network after reception of the second message in the RA procedure, wherein the third message includes at least a D2D buffer status report (BSR) medium access control (MAC) control element (CE); and
      determine that the RA procedure is successful upon receipt of a second UL resource if the D2D BSR MAC CE is not associated with the first D2D communication session and the second D2D communication session, or upon receipt of a D2D resource if the D2D BSR MAC CE is associated with the first D2D communication session and the second D2D communication session.

5. The UE of claim 4, wherein the D2D BSR MAC CE is a truncated D2D BSR MAC CE if the D2D BSR MAC CE is not associated with the first D2D communication session and the second D2D communication session.

6. The UE of claim 4, wherein the D2D BSR MAC CE is not a truncated D2D BSR MAC CE if the D2D BSR MAC CE is associated with both the first D2D communication session and the second D2D communication session.

* * * * *